United States Patent
Hunt

(10) Patent No.: US 8,139,696 B2
(45) Date of Patent: Mar. 20, 2012

(54) BAUD RATE DETECTION

(75) Inventor: Richard Neil Hunt, Herts (GB)

(73) Assignees: MStar Semiconductor, Inc. (KY);
MStar Software R&D, Ltd., Shenzhen (CN); MStar France SAS, Issy les Moulineaux (FR); MStar Semiconductor, Inc. (TW)

( * ) Notice: Subject to any disclaimer, the term of this patent is extended or adjusted under 35 U.S.C. 154(b) by 1004 days.

(21) Appl. No.: 11/629,986

(22) PCT Filed: Jul. 1, 2005

(86) PCT No.: PCT/GB2005/002596
§ 371 (c)(1),
(2), (4) Date: Dec. 19, 2006

(87) PCT Pub. No.: WO2006/003417
PCT Pub. Date: Jan. 12, 2006

(65) Prior Publication Data
US 2007/0294044 A1     Dec. 20, 2007

(30) Foreign Application Priority Data
Jul. 1, 2004  (GB) .................................. 0414793.0

(51) Int. Cl.
*H04L 7/00* (2006.01)
(52) U.S. Cl. ........ 375/355; 375/222; 375/377; 375/225; 375/354; 375/369; 375/316; 375/342; 379/93.08; 708/504; 708/650
(58) Field of Classification Search .................. 375/222, 375/377, 225, 354, 369, 316, 355, 342; 379/93.08; 708/504, 650
See application file for complete search history.

(56) References Cited

U.S. PATENT DOCUMENTS

| | | | |
|---|---|---|---|
| 3,747,074 A | 7/1973 | Schulze | |
| 4,584,690 A | 4/1986 | Cafiero et al. | |
| 4,761,800 A * | 8/1988 | Lese et al. | 375/370 |
| 5,222,081 A | 6/1993 | Lewis et al. | |
| 5,631,925 A | 5/1997 | Koenzen | |
| 5,654,983 A | 8/1997 | Sauser, Jr. | |
| 5,923,705 A | 7/1999 | Willkie et al. | |
| 5,935,270 A * | 8/1999 | Lin | 714/795 |
| 6,097,754 A * | 8/2000 | Fitch et al. | 375/222 |
| 6,198,785 B1 * | 3/2001 | Flynn | 375/377 |

(Continued)

FOREIGN PATENT DOCUMENTS

EP        0 669 738 A2    8/1995

(Continued)

OTHER PUBLICATIONS

Hart, Frank, EP 6 669 738 A2, Aug. 30, 1995.*

(Continued)

*Primary Examiner* — Siu Lee
(74) *Attorney, Agent, or Firm* — Edell, Shapiro & Finnan, LLC

(57) ABSTRACT

A method is provided of characterising a data stream of binary symbols, the method comprising sampling the stream at a predetermined rate sufficient to capture at least two samples per binary symbol, identifying the shortest continuous run of samples having the same logic level and assigning a symbol rate to the stream on the basis that the identified run is one symbol in length.

16 Claims, 2 Drawing Sheets

U.S. PATENT DOCUMENTS

Figure 1:
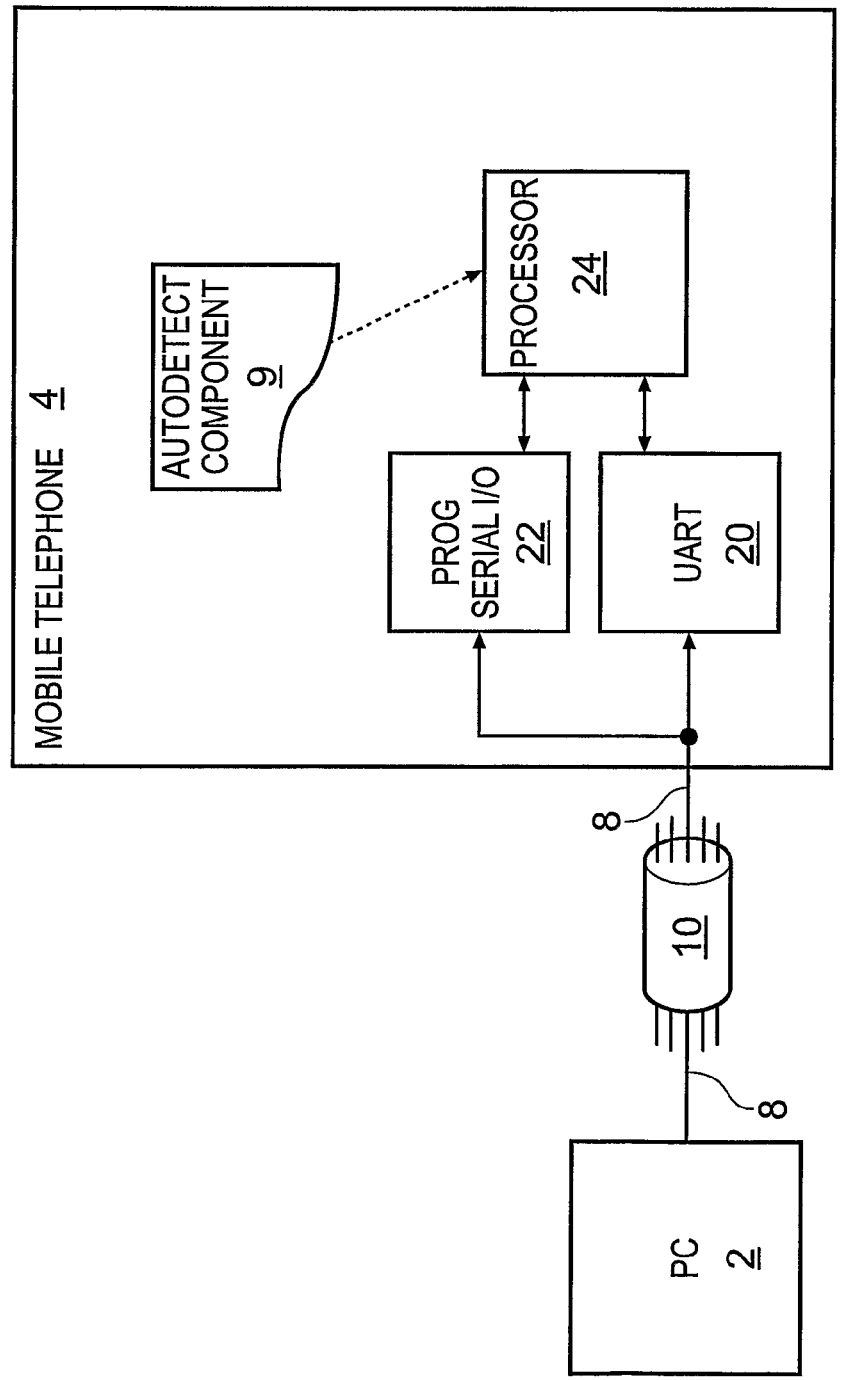

| | | | |
|---|---|---|---|
| 6,285,722 B1 | 9/2001 | Banwell et al. | |
| 6,292,014 B1 | 9/2001 | Hedberg | |
| 6,970,525 B1 * | 11/2005 | Kljajic et al. | 375/354 |
| 2003/0225492 A1 * | 12/2003 | Cope et al. | 701/35 |
| 2004/0062331 A1 * | 4/2004 | Samuel | 375/360 |

FOREIGN PATENT DOCUMENTS

| | | |
|---|---|---|
| EP | 0669738 A2 | 8/1995 |
| EP | 0 918 421 A1 | 5/1999 |
| EP | 1 122 921 A1 | 8/2001 |
| EP | 1122921 A1 | 8/2001 |
| GB | 2 324 688 A | 10/1998 |
| WO | WO9948244 | 9/1999 |

OTHER PUBLICATIONS

Search Report undr Section 17 dated Apr. 28, 2005.
International Search Report dated Oct. 6, 2005.
European Communication 05756937.8, (4 pages).

* cited by examiner

BAUD RATE DETECTION

The invention relates to methods of, and apparatus for, characterising a data stream whose properties can vary from time to time.

It is common practice to provide a mobile telephone with a UART (universal asynchronous receiver/transmitter) for exchanging data with an external device such as a PC, over an RS232 link. The advantages of including a UART in a mobile telephone are widely understood. For example, a PC can use a mobile telephone as an "external modem" for sending and receiving data over the wireless network to which the telephone belongs by connecting to the telephone by means of an RS232 link.

An RS232 link interconnects a DTE (data terminal equipment) with a data circuit terminating equipment (DCE). The DTE is the entity that is sending data into the link and the DCE is the entity that is receiving data from the link. The speed and transmission settings at each end of an RS232 communications link between a DTE and a DCE have to be set to the same values and this configuration process can lead to difficulties for a user. This is especially the case where one end of an RS232 link, usually the DCE, is implemented on a simple consumer device, such as a mobile telephone, where the adjustment of the relevant communications settings is often an unfamiliar process requiring the user to access complex menus with the result that the configuration task is often done incorrectly.

Rather than have a user manually configure the communications settings of an RS232 link, it is possible to arrange for a DCE to adapt itself to the communications settings of a DTE with which it is to form an RS232 link. This requires a DCE to analyse the data stream received from a DTE, which stream consists of a sequence of positive and negative voltage pulses that represent binary symbols. The width of these pulses depends upon the transmission speed of the RS232 link and the number and arrangement of the symbols depends on the parity and other settings of the RS232 link.

Perhaps one of the simplest ways to discriminate the transmission speed of a data stream from a DTE is for a DCE to use a timer to measure the width of the pulses in the data stream. However, such a timer would need a clock having a frequency several times higher than the maximum baud rate expected in the RS232 link. It can be difficult to implement such a clock without using specialised hardware and the use of such hardware is undesirable in the context of devices such as mobile telephones where it is preferred to implement functions in software so that they can be performed by a standard microprocessor chip. Implementing such a clock in software would lead to a significant real-time load on the host processor as the clock would involve a periodic processor interrupt at the clock frequency, where for each interrupt the processor would need to perform several instructions.

According to one aspect, the invention relates to a method of characterising a data stream of binary symbols, the method comprising sampling the stream at a predetermined rate sufficient to capture at least two samples per binary symbol, identifying the shortest continuous run of samples having the same logic level and assigning a data rate to the stream on the basis that the identified run is one symbol in length.

The invention also consists in apparatus for characterising a data stream of binary symbols, the apparatus comprising means for sampling the stream at a predetermined rate sufficient to capture at least two samples per binary symbol, means for identifying the shortest continuous run of samples having the same logic level and means for assigning a data rate to the stream on the basis that the identified run is one symbol in length.

From one particular view point, the invention provides a method of determining the baud rate of an RS232-format data stream, the method comprising sampling the stream at a predetermined rate, identifying the shortest continuous run of samples having the same logic level and assigning a baud rate to the stream on the basis that the identified run is one baud in length. The invention also relates to apparatus for carrying out such a method.

The invention also encompasses a method of characterising an RS232-format data stream comprising a series of characters each packaged in a frame, the method comprising sampling the stream at a predetermined rate, identifying the shortest continuous run of samples having the same logic level, assigning a baud rate to the stream on the basis that the identified run is one baud in length, recovering one or more frames from the stream on the basis of the assigned baud rate and determining the parity of one or more recovered frames in order to estimate whether or not characters are being transmitted with parity bits. The invention also relates to apparatus for carrying out such a method.

In a preferred embodiment, a set of symbol length ranges are provided, each range having a nominal data rate, and the symbol length given by the identified run is compared with the ranges such that the nominal data rate of the range into which the identified run falls is the data rate that is assigned to the data stream. In an alternative embodiment, the data rate that is assigned to the data stream is the reciprocal of the duration of the identified run.

The symbols in the data stream may be organised into successive frames, in which case it may be possible to calculate the parity of at least one frame of the stream in order to make a determination about the frame structure. Preferably, such an assessment of frame structure is based on the assessment of the parities of several frames in order to improve the likelihood that the determination that is made about the frame structure is correct.

It is common for base band processor integrated circuits for mobile phones to incorporate general serial input/output hardware, not adapted specifically for RS232, which allows the clocking of serial data into a shift register at a rate which can be programmed; and the contents of the serial shift register to be loaded into processor memory, often by a direct memory access (DMA) process which does not impose a large software overhead. In certain embodiments, the invention uses such i/o hardware to sample the data stream under investigation.

Preferably, the predetermined rate of the sampling operation is at least double the highest expected data rate of the stream.

Preferably, but not exclusively, the invention is used to determine the baud rates and, optionally, the parity settings used in data signals sent to mobile telephones through an RS232 link.

The invention can also be implemented as a program for causing data processing apparatus to perform the data stream analysis techniques of the invention.

Figure 2:
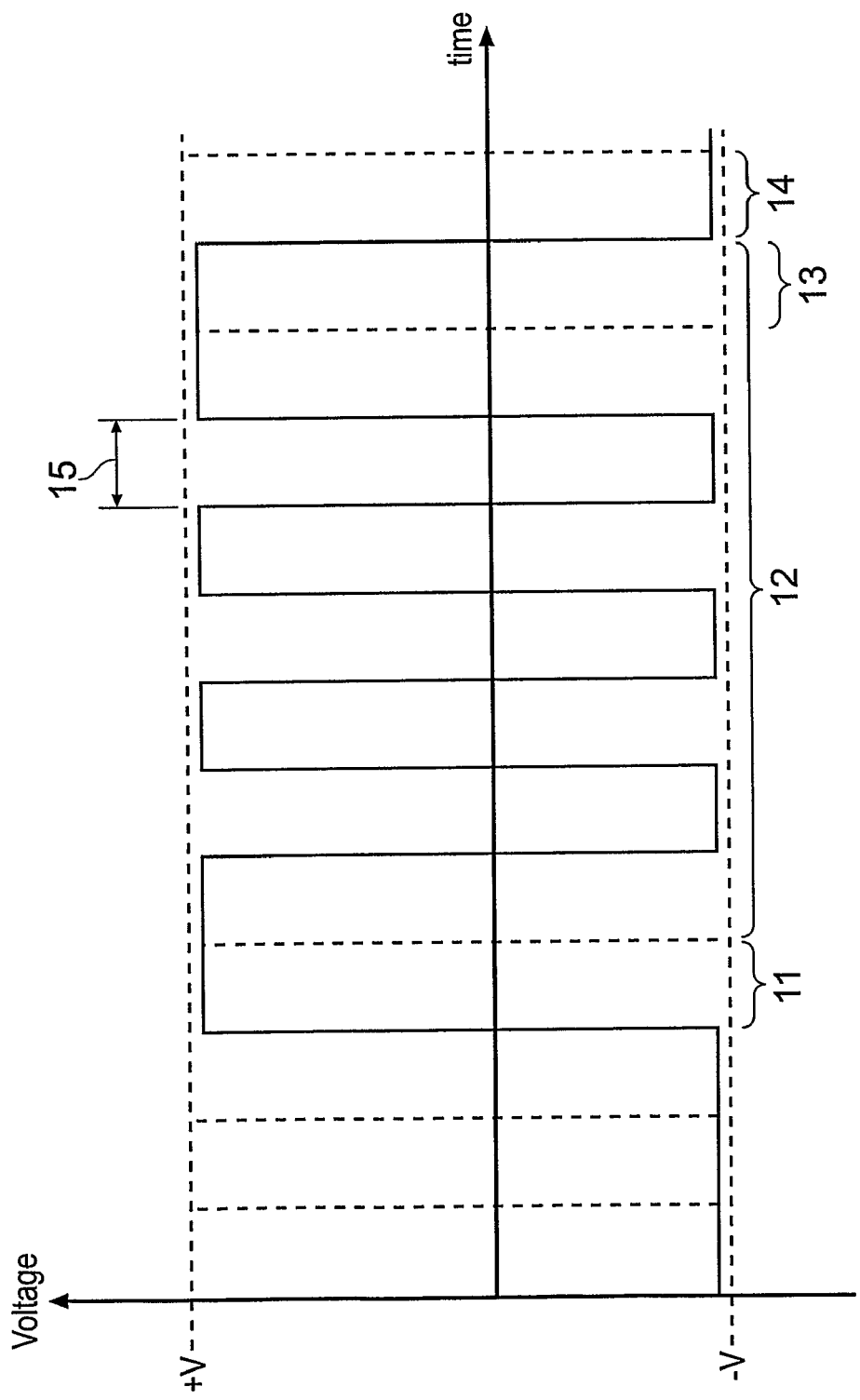

By way of example only, certain embodiments of the invention will now be described by reference to the accompanying figures, in which:

FIG. 1 is a block diagram illustrating an RS232 link between a PC and a mobile telephone; and FIG. 2 illustrates the wave form of a typical ASCII character received asynchronously over an RS232 to link.

In FIG. 1, a PC 2 is shown connected to a mobile telephone 4 via an RS232 link 10. The structure of the telephone 4 is presented in simplified form in FIG. 1, including only those elements that are necessary for describing the operation of the present embodiment of the invention.

The RS232 link 10 connects the PC 2 to a UART 20 within the telephone 4. The data line 8 of the RS232 link is shown extending between the PC 2 and the UART 20. Data signals travelling between the PC 2 and the UART 20 10 have the general wave form shown in FIG. 2, in which a positive voltage level V, typically between 8 and 14 volts, represents a logical 0 and a nominally equally negative voltage level represents a logical 1. The wave form shown in FIG. 2 represents a single ASCII eight bit character being transferred as a group of ten pulses, where:

- prior to the first pulse 11, the wave form remains at the negative voltage level;
- the first pulse 11 is a start bit, which is a logical 0, signalling the start of the character;
- a payload section 12 of eight bits for conveying the ASCII character follows the start bit;
- in the event that the character in the payload section 12 is seven bits long, a parity bit 13 is added to complete the payload section and force the parity of the payload section 12 to even or odd to conform with the parity setting of the transmission;
- a stop bit of logical 1 is appended to the payload section 12 to indicate the end of the group of pulses defining the character (the stop bit essentially defines the minimum inter-character gap, although other values of inter-character gap are permissible, such as 1.5 and 2 bauds); and
- each pulse is of the same duration, indicated 15, this duration being the reciprocal of the baud rate.

The PC 2 is configured to send data through the RS232 link 10 at a certain baud rate and with a certain parity setting and the UART 20 must be configured to match these settings if the data sent from the PC is to be received correctly be the telephone 4. The UART 20 is configured and controlled by a general purpose microprocessor 24 in the telephone 4. A memory resource within the telephone includes an auto-detect software module 9 that can be run by the processor 24 to discriminate the baud rate and parity setting that are being used by the PC 2 so that the user of the telephone 4 does not have to make these settings manually. The processor executes the auto-detect component 9 following a reported error in the incoming data stream (e.g. start bit not detected, stop bit not detected or incorrect parity) or a change in control line (DTR, CTS) state. The auto-detect component 9 does not, therefore, operate continuously, thereby lessening the processing burden on the processor 24. As is commonly the case, the telephone 4 includes, in addition to the UART 20, a programmable serial input/output circuit 22 and the auto-detect module 9 is arranged to use this circuit to analyse data travelling to the telephone 4 on the data line 8.

The auto-detect component 9 configures the i/o circuit 22 to sample the data line 8, as indicated by notional path 3. The baud rate used by the PC 2 is selected from a standard range of rates, which in this example are 4,800, 9,600, 19,200, 57,600, 115,200 and 230,400 Hz and the auto-detect component 9 configures the i/o circuit 22 to sample the data line 8 at twice the maximum baud rate that can be used by the PC 2, i.e. at 460,800 Hz. The auto-detect component 9 is arranged to cause the i/o circuit 22 to co-ordinate the capture of samples to commence with the start bit on the data line 8 that follows the error that triggered the processor 24 into executing the auto-detect component. The auto-detect component 9 causes the i/o circuit 22 to capture a train of samples that is sufficient to capture an entire character, i.e. ten pulses, at the slowest baud rate that is to be detected.

Given that the sampling rate of the i/o circuit 22 is set to 460,800 Hz and the slowest baud rate that can be used by the PC 2 is 4,800 Hz, the captured train of samples is to be at least 960 samples long. This sampling process occurs in parallel with the normal data communication activities of the UART 20, which continues to interpret the signal arriving at the telephone 4 on the data line 8 at the current baud rate and parity settings until a decision to change either or both of the settings is made by the auto-detect component 9.

The auto-detect component 9 configures the i/o circuit 22 to write the captured sample train directly into a memory resource within the telephone, bypassing the processor 24. In this way, the auto-detect component 9 can cause a train of samples to be captured for baud rate and parity analysis without impacting greatly on the processing load of the processor 24. This is advantageous since the processor 24 is likely to be engaged in other processing activities that need to be completed in real-time.

Once the auto-detect component 9 has completed the collection of a train of samples, it scans the train to determine the shortest run of samples that share the same logical state. The length of the run so identified is then assumed to correspond to the period of a single baud. As all RS232 command queries start with the characters "A" and "T", this assumption is likely to be valid ("A" is 0010000011 and "T" is 0010101001—including start and stop bits).

The auto-detect component 9 then translates the minimum run length into a baud rate for the data stream arriving at the telephone 4 through the RS232 link by comparing the minimum run length with a look-up table. The use of a look-up table means that the baud rate of the arriving data stream can be determined rapidly without having to perform computations. Also, the use of a look-up table allows significant tolerances between the baud rate of the PC 2 and that of the UART 20 to be accommodated.

The look-up table used in an embodiment of the invention in which the auto-detect component 9 samples the data stream at 460,800 Hz is given below:

| Run-Length Range | Nominal Baud Rate |
| --- | --- |
| 1-2 | 230,400 |
| 3-5 | 115,200 |
| 6-9 | 57,600 |
| 10-13 | 38,400 |
| 14-19 | 28,800 |
| 20-28 | 19,200 |
| 29-40 | 14,400 |
| 41-72 | 9,600 |
| 73-144 | 4,800 |
| 145-288 | 2,400 |
| 289-960 | 1,200 |
| 961-2112 | 300 |

The minimum run length determined by the auto-detect component 9 from the sample train is compared with the run length ranges listed in the left-hand column of the table. The nominal baud rate in the row of the table that holds the run length range containing the measured minimum run length is then allocated to the data stream arriving on the data line 8 of the RS232 link 10.

In an alternative embodiment, an actual baud rate can be deduced by calculation by taking the reciprocal of the period of time covered by the minimum run length scanned in the sample train acquired by the auto-detect component 9. In a further variant, a baud rate could be assigned by processing the minimum run length through a software decision tree.

Once a baud rate has been allocated to the data stream, the incoming bits on the data line can, if desired, be reconstructed. For example, if the auto-detect component 9 samples the incoming data stream at a rate of 460,800 Hz, then a received character "T" transmitted at 57,600 bps would, if the start and stop bits are neglected, be received as the following train of samples:

00000000111111110000000011111111000000001111
1111100000000000000000

Assuming that the auto-detect component 9 has correctly determined the number of samples in a single baud, then the auto-detect component 9 will reduce the above signal train to a binary sequence of:

01010100

Since this recovered payload section contains only three symbols of logical 1, it has odd parity. The auto-detect component 9 can therefore conclude that this payload section contains either an eight bit character without a parity bit or a seven bit character with a parity bit that has been set to give the payload section odd parity. Therefore, the auto-detect component 9 needs to analyse several successive recovered payload sections in order to make a determination about the parity setting of the incoming data stream with a degree of confidence. For example, if the next three payload sections from the data stream are also perceived by the auto-detect component 9 to have odd parity, then the auto-detect component can conclude that the arriving data stream contains seven bit characters with accompanying parity bits that have been set to give their payload sections odd parity; otherwise, the auto-detect component could conclude that the incoming data stream consists of payload sections containing eight bit characters with no accompanying parity bits.

Once the auto-detect component 9 has determined the baud rate and, optionally, the parity setting of the data stream arriving via data line 8, the auto-detect component causes the processor 24 to impose these settings on the UART 20 which henceforth employs them in the interpretation of the incoming data stream. In the event that one or both of the baud rate and the parity setting change again or have been incorrectly estimated by the auto-detect component 9, the auto-detect component is triggered into performing another round of the baud rate and parity setting estimation process.

The invention claimed is:

1. A method of characterising a data stream of binary symbols, the method comprising:
   sampling the data stream at a predetermined rate sufficient to capture an entire character to obtain a sample train having at least two samples per binary symbol,
   storing the sample train in memory,
   identifying the shortest continuous run of samples having the same logic level by scanning the sample train in the memory,
   assigning, using a look-up table, a symbol rate to the data stream on the basis that the identified shortest continuous run is one symbol in length, and
   reconstructing the stream from the sample train in the memory using the assigned symbol rate.

2. A method as claimed in claim 1, wherein assigning a symbol rate to the stream comprises comparing the length of the identified run with a set of ranges, each range being associated with a symbol rate, and assigning the symbol rate associated with the range into which the length of the identified run falls.

3. A method as claimed in claim 1, wherein assigning a symbol rate to the stream comprises taking the reciprocal of the duration of the identified run.

4. A method as claimed in claim 1, wherein assigning a symbol rate to the stream comprises processing the identified run through a software decision tree.

5. A method as claimed in claim 1, wherein the predetermined rate is at least double the highest expected symbol rate of the stream.

6. A method as claimed in claim 1, further comprising recovering one or more frames of symbols from the stream on the basis of the assigned symbol rate and determining the parity of one or more recovered frames in order to estimate whether or not characters are being transmitted with parity bits.

7. An apparatus for characterising a data stream of binary symbols, the apparatus comprising:
   means for sampling the data stream at a predetermined rate sufficient to capture an entire character to obtain a sample train having at least two samples per binary symbol,
   means for storing the sample train in memory,
   means for identifying the shortest continuous run of samples having the same logic level by scanning the sample train in the memory,
   means for assigning, using a look-up table, a symbol rate to the data stream on the basis that the identified shortest continuous run is one symbol in length, and
   means for reconstructing the data stream from the sample train in the memory using the assigned symbol rate.

8. An apparatus as claimed in claim 7, wherein the means for assigning a symbol rate to the stream comprises means for comparing the length of the identified run with a set of ranges, each range being associated with a symbol rate, and means for assigning the symbol rate associated with the range into which the length of the identified run falls.

9. An apparatus as claimed in claim 7, wherein the means for assigning a symbol rate to the stream comprises means for taking the reciprocal of the duration of the identified run.

10. An apparatus as claimed in claim 7, wherein the means for assigning symbol rate to the stream comprises means for processing the identified run through a software decision tree.

11. An apparatus as claimed in claim 7, wherein the predetermined rate is at least double the highest expected symbol rate of the system.

12. An apparatus as claimed in claim 7, further comprising means for recovering one or more frames of symbols from the stream on the basis of the assigned data rate and means for determining the parity of one or more recovered frames in order to estimate whether or not characters are being transmitted with parity bits.

13. A method of determining the baud rate of an RS232-format data stream, the method comprising:
   sampling the data stream at a predetermined rate to capture an entire character to obtain a sample train having at least two samples per binary symbol,
   storing the sample train in memory,
   identifying the shortest continuous run of samples having the same logic level by scanning the sample train in the memory,
   assigning, using a look-up table, a baud rate to the data stream on the basis that the identified shortest continuous run is one baud in length,
   and reconstructing the data stream from the sample train in the memory using the assigned baud rate.

14. A method of characterising an RS232-format data stream comprising a series of characters each packaged in a frame, the method comprising:

sampling the data stream at a predetermined rate to capture an entire character to obtain a sample train having at least two samples per binary symbol, storing the sample train in memory, identifying the shortest continuous run of samples having the same logic level by scanning the sample train in the memory, assigning, using a look-up table, a baud rate to the data stream on the basis that the identified shortest continuous run is one baud in length, recovering one or more frames from the sample train in the memory on the basis of the assigned baud rate, and determining parity of the one or more recovered frames in order to estimate whether or not characters are being transmitted with parity bits.

15. An apparatus for determining the baud rate of an RS232-format data stream, the apparatus comprising:

means for sampling the data stream at a predetermined rate to capture an entire character to obtain a sample train having at least two samples per binary symbol, means for storing the sample train in memory, means for identifying the shortest continuous run of samples having the same logic level by scanning the sample train in the memory, means for assigning, using a look-up table, a baud rate to the data stream on the basis that the identified shortest continuous run is one baud in length, and means for reconstructing the data stream from the sample train in the memory using the assigned baud rate.

16. An apparatus for characterising an RS232-format data stream comprising a series of characters each packaged in a frame, the apparatus comprising:

means for sampling the data stream at a predetermined rate to capture an entire character to obtain a sample train having at least two samples per binary symbol, means for storing the sample train in memory, means for identifying the shortest continuous run of samples having the same logic level by scanning the sample train in the memory, means for assigning, using a look-up table, a baud rate to the data stream on the basis that the identified shortest continuous run is one baud in length, means for recovering one or more frames from the sample train in the memory on the basis of the assigned baud rate, and means for determining parity of the one or more recovered frames in order to estimate whether or not characters are being transmitted with parity bits.

* * * * *